(12) United States Patent
Lo et al.

(10) Patent No.: US 10,809,771 B2
(45) Date of Patent: Oct. 20, 2020

(54) DISPLAY VIEWING POSITION SETTINGS BASED ON USER RECOGNITIONS

(71) Applicant: Hewlett-Packard Development Company, L.P., Houston, TX (US)

(72) Inventors: Chin-Ta Lo, Taipei (TW); Yi-Lin Lee, Taipei (TW); Chin-Lung Chiang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/066,405

(22) PCT Filed: Mar. 18, 2016

(86) PCT No.: PCT/US2016/022996
§ 371 (c)(1),
(2) Date: Jun. 27, 2018

(87) PCT Pub. No.: WO2017/160302
PCT Pub. Date: Sep. 21, 2017

(65) Prior Publication Data
US 2019/0004570 A1      Jan. 3, 2019

(51) Int. Cl.
*G06F 1/16*     (2006.01)
*G06K 9/00*    (2006.01)
(Continued)

(52) U.S. Cl.
CPC .............. *G06F 1/1675* (2013.01); *G06F 1/16* (2013.01); *G06F 1/1601* (2013.01); *G06F 1/1605* (2013.01); *G06F 1/1637* (2013.01); *G06F 1/1686* (2013.01); *G06F 3/01* (2013.01); *G06F 3/0304* (2013.01); *G06F 3/04897* (2013.01);
(Continued)

(58) Field of Classification Search
CPC ...... G06F 16/5854; G06F 1/16; G06F 1/1601; G06F 1/1605; G06F 1/1637; G06F 1/1675; G06F 1/1686; G06F 3/01; G06F 3/0304; G06F 3/04897; G06K 9/00268; G06K 9/00892; G09G 2320/068; G09G 2320/08;
(Continued)

(56) References Cited

U.S. PATENT DOCUMENTS

| 8,218,080 B2 | 7/2012 | Xu et al. |
| 2008/0130958 A1 | 6/2008 | Ziomek |
| 2008/0215189 A1* | 9/2008 | Baumann .............. G06F 3/0482 701/1 |
| 2009/0025022 A1 | 1/2009 | Blatchley et al. |
| 2009/0174658 A1* | 7/2009 | Blatchley .............. G06F 1/1601 345/158 |

(Continued)

FOREIGN PATENT DOCUMENTS

WO    WO-2002071315 A2    9/2002

OTHER PUBLICATIONS

Shinjo, et al. "Intelligent User Interface Based on Multimodal Dialog Control for Audio-visual Systems", http://www.hitachi.com, 2006, 5 pages.

*Primary Examiner* — Sing-Wai Wu
(74) *Attorney, Agent, or Firm* — Global IP Services

(57) ABSTRACT

In one example, an electronic device is described, which includes a position activator, a database including display positions associated with a plurality of users, and a processor coupled to the position activator and the database. The processor may retrieve a display position corresponding to a user operating the electronic device from the database and trigger the position activator to set a viewing position of a display of the electronic device based on the retrieved display position.

15 Claims, 3 Drawing Sheets

(51) Int. Cl.
  *G09G 5/00* (2006.01)
  *G06F 3/01* (2006.01)
  *G06F 3/0489* (2013.01)
  *H04N 5/44* (2011.01)
  *G06F 3/03* (2006.01)
  *G06F 16/583* (2019.01)
  *H04N 5/445* (2011.01)
  *H04N 5/655* (2006.01)

(52) U.S. Cl.
  CPC ..... *G06F 16/5854* (2019.01); *G06K 9/00268* (2013.01); *G06K 9/00892* (2013.01); *G09G 5/003* (2013.01); *H04N 5/4403* (2013.01); *G09G 2320/068* (2013.01); *G09G 2320/08* (2013.01); *H04N 5/655* (2013.01); *H04N 2005/44517* (2013.01)

(58) Field of Classification Search
  CPC ......... G09G 5/003; H04N 2005/44517; H04N 5/4403; H04N 5/655
  See application file for complete search history.

(56) References Cited

U.S. PATENT DOCUMENTS

| | | |
|---|---|---|
| 2010/0295827 A1 | 11/2010 | Lim et al. |
| 2011/0292009 A1 | 12/2011 | Wang et al. |
| 2014/0237589 A1 | 8/2014 | Suggs |
| 2014/0347451 A1 | 11/2014 | Kampmann et al. |
| 2015/0070271 A1 | 3/2015 | Chen et al. |
| 2015/0242986 A1 | 8/2015 | Yoshizawa |

* cited by examiner

DISPLAY VIEWING POSITION SETTINGS BASED ON USER RECOGNITIONS

BACKGROUND

Users are increasingly utilizing electronic devices such as desktop computers, personal computers, all-in-one personal computers, tablet computers, notebook computers, game players, and televisions, for performing various tasks. For example, users may view electronic device displays from different locations or positions.

BRIEF DESCRIPTION OF THE DRAWINGS

Examples are described in the following detailed description and in reference to the drawings, in which.

DETAILED DESCRIPTION

Users may have differing preferences for viewing position of electronic devices such as personal computers. As users take turns using such a device, each user may have to adjust the viewing position of the electronic device in accordance with the users preference. The users may have to manually adjust the viewing position of the electronic device, and therefore time and labor may be involved.

Examples described herein may provide a database including settings information related to display positions and user information related to users associated with the display positions (i.e., individual settings associated with each user). For example, the user information stored in the database may be face image of the user instructing the settings change to the electronic device. The user information and settings information related to individual settings for each user can be registered in advance in the database. During operation, a user of an electronic device may be recognized by a user recognition engine using the user information. For example, user information may be extracted from input data and the extracted user information may be compared with the user information stored in the database to recognize the user. Further, a preferred display position of the recognized user may be retrieved using the settings information. Furthermore, a viewing position of a display of the electronic device may be automatically set (e.g., adjusted) based on the retrieved display position.

For example, automatically adjusting the viewing position of the display may include adjusting a height of the display, a viewing angle (i.e., angular position) of the display, or a combination thereof. In this case, adjusting the viewing angle of the display may include adjusting a horizontal viewing angle of the display, adjusting a vertical viewing angle of the display, rotating the display in clockwise or counter clockwise direction along an X-Y plane, or a combination thereof. Similarly, other settings associated with electronic device such as volume, equalization, resolution, contrast and/or brightness, for example, can also be automatically set/adjusted based on user recognition.

As described below, examples described herein may automatically set viewing position of the display when logging to an electronic device based on facial recognition technique. Thereby, enabling each member of a group, such as a family or a small company, to share the same electronic device without wasting time on re-configuring the settings (i.e., adjusting the viewing position of the display). Also, users may experience that the default settings of the electronic device may be like the personal settings of the users.

Figure 1:
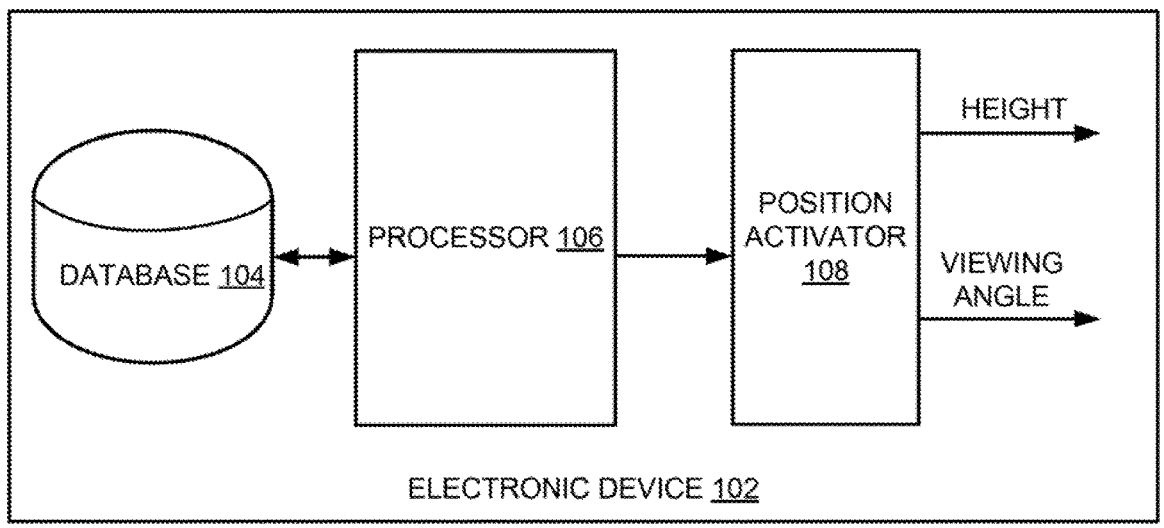
FIG. 1 is a block diagram of an example electronic device including components to set a display viewing position corresponding to a user.

Turning now to the figures, FIG. 1 is a block diagram of example electronic device 102 including components to set a display viewing position corresponding to a user. Example electronic device may include a desktop computer, portable personal computer, all-in-one personal computer, a tablet computer, a notebook computer, a game player, or a television. Further, electronic device 102 may include a display for presenting visual information, such as text, graphics, and the like. Electronic device 102 may include position activator 108, database 104 and processor 106 coupled to position activator 108 and database 104.

Database 104 may be a storage unit to store display positions associated with a plurality of users and user information related to the users associated with the display positions. Example user information stored in database 104 may include face image of the user instructing the settings change to electronic device 102. The user information and settings information (e.g., display positions associated with the users) related to individual settings for each user can be registered/stored in advance in database 104. In the example shown in FIG. 1, database 104 is shown as a part of electronic device 102, however, database 104 can also reside in an external storage device, such as a hard disk, a storage card, or a data storage medium and can be accessible by electronic device 102.

During operation, processor 106 may retrieve a display position corresponding to a user operating electronic device 102 from database 104. In one example, the user operating electronic device 102 may be recognized using a facial recognition process, a gesture recognition process, a speech recognition process, a voiceprint analysis process or the like. Further, processor 106 may trigger position activator 108 to set a viewing position of a display of electronic device 102 based on the retrieved display position. Position activator 108 may adjust a height of the display, a viewing angle of the display, or a combination thereof. For example, the position activator may adjust a horizontal viewing angle of the display, adjust vertical viewing angle of the display, rotate the display in clockwise or counter clockwise direction along the X-Y plane, or a combination thereof. The vertical viewing angle may refer to a degree above or below an imaginary horizontal line at the level of the viewer's eyes and the center of the display. The horizontal viewing angle may refer to a degree left or right to an imaginary horizontal line at the level of the viewer's eyes and the center of the display.

Figure 2:
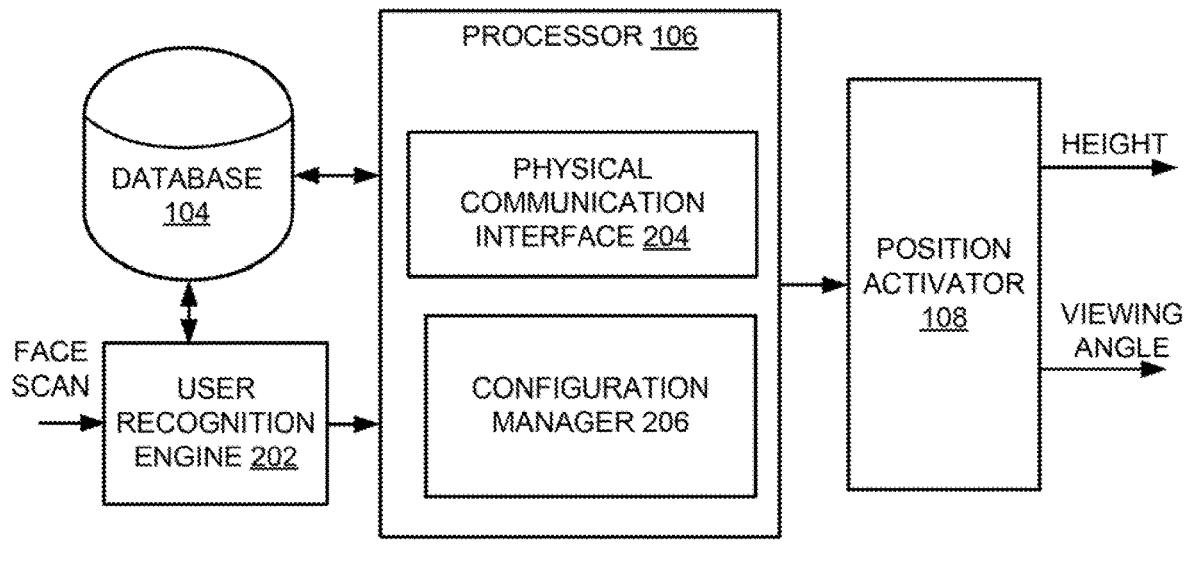
FIG. 2 is a block diagram of the example electric device illustrating additional components.

Referring now to FIG. 2, which is a block diagram of the example electronic device shown in FIG. 1, illustrating additional components. Electronic device 102 may include user recognition engine 202. Processor 106 may include physical communication interface 204 and configuration manager 206. User recognition engine 202 and position activator 108 may be connected to processor 106 via physical communication interface 204. In the example of FIG. 2, database 104 is shown as being connected to processor 106 and user recognition engine 202, however, database 104 can also be implemented as a part of user recognition engine 202 and/or processor 106.

During operation, an image capturing device may capture video data of the user viewing the display of the electronic device. The image capturing device may include an inbuilt camera in electronic device 102 or an external camera communicatively connected to electronic device 102. The image capturing device may provide video data (e.g., image data) to user recognition engine 202. In one example, the image capturing device may capture video data of the user of the electronic device 102 when the user starts/logs into electronic device 102. Further, user recognition engine 202 may extract face information from the video data received from the image capturing device. Furthermore, user recognition engine 202 may recognize a face of the user (i.e., identifies the user of electronic device 102) by comparing the extracted face information with face information (i.e., face image) stored in advance in database 104. Even though the examples herein describe recognizing user using facial recognition process, other techniques such as gesture recognition process, speech recognition process, voiceprint analysis process and the like can also be used to recognize the user.

For example, when face information of user A is registered in database 104, then user recognition engine 202 (e.g., facial recognition engine) may identify the user of electronic device 102 as the user A by the aforementioned facial recognition process. In another example, when user A has registered the keyword information in database 104, user recognition engine 202 (e.g., speech recognition engine) can identify the user of electronic device 102 as the user A by speech recognition process in which the extracted keyword information from input voice may be compared with keyword information that the user A has stored in advance in database 104.

In yet another example, when user A has registered the voiceprint information in database 104, user recognition engine 202 (e.g., voiceprint analysis engine) can identify the user of electronic device 102 as the user A by voiceprint analysis process in which extracted voiceprint information from voice uttered by user A may be compared with voiceprint information that the user A has stored in advance in database 104. In yet another example, when user A has registered gesture information in database 104, user recognition engine 202 (e.g., gesture recognition engine) can identify the user of electronic device 102 as user A by the gesture recognition process in which the extracted gesture information from the input image may be compared with gesture information stored by a user of electronic device 102 in advance in database 104.

Upon recognizing the user, configuration manager 206 residing in processor 106 may retrieve the display position corresponding to the user from database 104. For example, configuration manager 206 may retrieve a display position associated with a user using the settings information stored in database 104. Then, position activator 108 may adjust a height of the display, a viewing angle of the display, or a combination thereof based on the retrieved display position. In one example, user recognition engine 202, configuration manager 206, and position activator 108 may be implemented as engines or modules comprising any combination of hardware and programming to implement the functionalities described herein.

Figure 3:
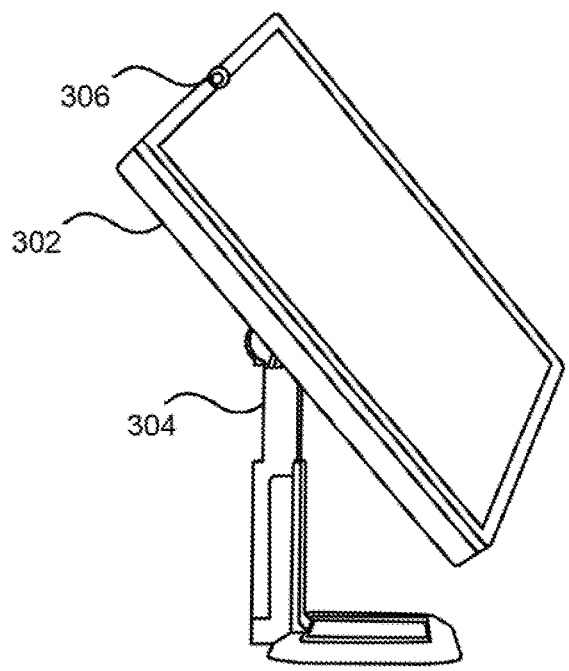
FIG. 3 is an example display illustrating a supporting platform to adjust the display viewing position.

Referring now to FIG. 3, which is an example display 302 illustrating supporting platform 304 to adjust the display viewing position. Example electronic device 300 may include supporting platform 304 connected to display 302 of electronic device 300 and image capturing device 306 (e.g., camera). Also, supporting platform 304 may be communicatively coupled to a processor and/or a position activator of electronic device 300. In one example, electronic device 300 may be a device (e.g., all-in-one computer) that houses each component except the keyboard and mouse inside the same case as display 302 or a device (e.g., desktop computer) that includes display 302 and a central processing unit externally connected to display 302. During operation, the position activator may set the viewing position of display 302 based on the retrieved display position via supporting platform 304.

Figure 4:
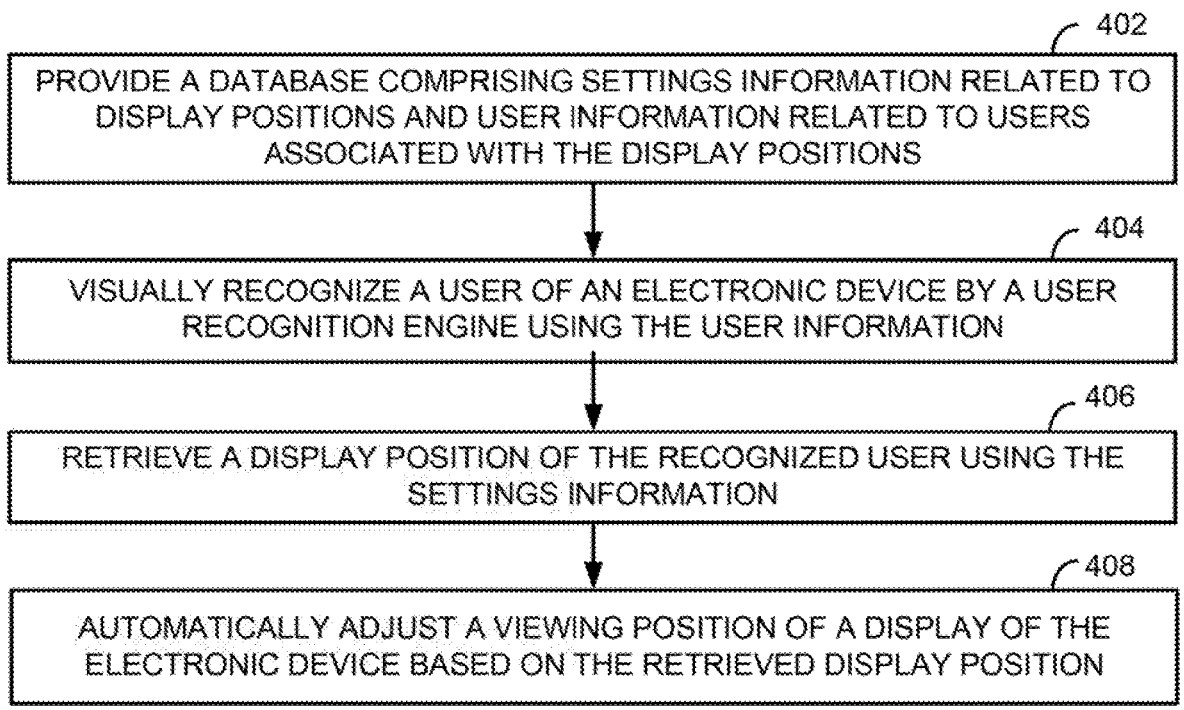
FIG. 4 is an example flow chart of a method for setting display viewing position based on user recognitions.

FIG. 4 is an example flowchart 400 of a method for setting display viewing position based on user recognitions. At 402, a database including settings information related to display positions and user information related to users associated with the display positions may be provided. For example, the settings information and the user information may be registered or stored in the database by users of the electronic device. The display positions may include positions change to be applied to the display and face information may include face information of the users associated with the display positions.

At 404, a user of an electronic device may be visually recognized by a user recognition engine using the user information. For example, face information may be extracted from input image data coming from an image capturing device (e.g., camera) and a facial recognition process may be performed in which the extracted face information may be compared with face information stored in the database to visually recognize the user.

At 406, a display position corresponding to the recognized user may be retrieved using the settings information in the database. At 408, a viewing position of a display of the electronic device may be automatically adjusted based on the retrieved display position. In one example, automatically adjusting the viewing position of the display may include adjusting a height of the display, a viewing angle of the display, or a combination thereof. Further, adjusting the viewing angle of the display may include adjusting a horizontal viewing angle of the display, adjusting a vertical viewing angle of the display, rotating the display in clockwise or counter clockwise direction along an X-Y plane, or a combination thereof. For example, the viewing position of the display may be automatically adjusted based on the retrieved display position via a supporting platform connected to the electronic device.

Figure 5:
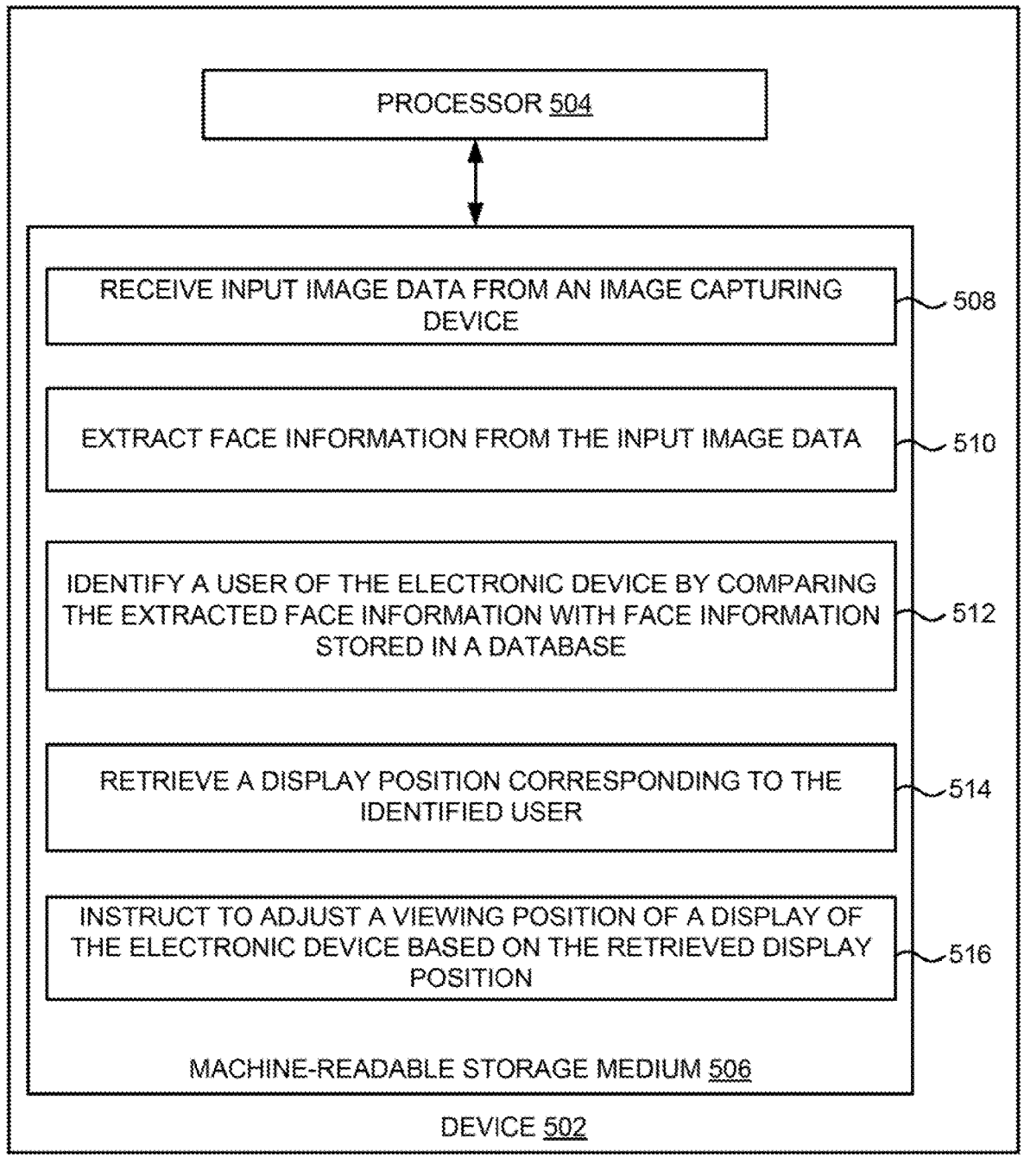
FIG. 5 illustrates a block diagram of an example computing device for setting display viewing positions based on user recognitions.

FIG. 5 illustrates a block diagram 500 of an example electronic device 502 for setting display viewing position based on user recognitions. The electronic device 502 may include processor 504 and a machine-readable storage medium 506 communicatively coupled through a system bus. Processor 504 may be any type of central processing unit (CPU), microprocessor, or processing logic that interprets and executes machine-readable instructions stored in the machine-readable storage medium 506. Machine-readable storage medium 506 may be a random access memory (RAM) or another type of dynamic storage device that may store information and machine-readable instructions that may be executed by processor 504. For example, the machine-readable storage medium 506 may be synchronous DRAM (SDRAM), double data rate (DDR), iambus DRAM (RDRAM), rambus RAM, etc., or storage memory media such as a floppy disk, a hard disk, a CD-ROM, a DVD, a pen drive, and the like. In an example, the machine-readable storage medium 506 may be a non-transitory machine-readable medium. In an example, the machine-readable storage medium 506 may be remote but accessible to the electronic device 502.

The machine-readable storage medium 506 may store instructions 508-516. In an example, instructions 508-516 may be executed by the processor 504 to provide a mechanism for setting display viewing position based on user recognitions. Instructions 508 may be executed by the processor 504 to receive input image data coming from an image capturing device (e.g., camera). Instructions 510 may be executed by the processor 504 to extract face information from the input image data. Instructions 512 may be executed by the processor 504 to identify a user of the electronic device by comparing the extracted face information with face information stored in a database. Instructions 514 may be executed by the processor 504 to retrieve display position corresponding to the identified user. Instructions 516 may be executed by the processor 504 to provide instructions to adjust the viewing position of the display of the electronic device based on the retrieved display position. Upon receiving instructions, the position activator may adjust the viewing position of the display based, on the retrieved display position.

It may be noted t hat the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on, as used herein, means based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
   a position activator;
   a database comprising a unique display position setting associated with each user identity of a plurality of user identities; and
   a processor coupled to the position activator and the database, wherein the processor is to:
      retrieve a first display position setting from the database corresponding to a first user identity of a first user operating the electronic device, wherein the first user identity is recognized utilizing a voiceprint analysis of a voice of the first user; and
      trigger the position activator to adjust a viewing position of a display of the electronic device, including an orientation of the display, based on the retrieved first display position setting from the database when the first user is recognized utilizing the voiceprint analysis of the voice of the first user, wherein adjusting the viewing position of the display includes adjusting the orientation of the display by rotating the display in a clockwise or counter clockwise direction along a plane, wherein the plane is planar to the display.

2. The electronic device of claim 1, wherein the position activator is to adjust a height of the display, a viewing angle of the display, or a combination thereof.

3. The electronic device of claim 2, wherein the position activator is to adjust a horizontal viewing angle of the display, adjust a vertical viewing angle of the display, or a combination thereof.

4. The electronic device of claim 1, further comprising instructions executable by the processor to recognize the first user operating the electronic device using a facial recognition process, a gesture recognition process, or a speech recognition process.

5. The electronic device of claim 1, further comprising:
   a supporting platform connected to the position activator and the display of the electronic device, and wherein the position activator is to set the viewing position of the display based on the retrieved display position setting via the supporting platform.

6. The electronic device of claim 1, further comprising:
   a camera utilizable to capture video data of the user of the electronic device; and
   instructions executable by the processor to:
      extract face information from the video data received from the camera; and
      recognize a face of the first user by comparing the extracted face information with face information stored in the database, wherein the processor to retrieve the display position corresponding to the first user upon recognizing the face of the first user.

7. A method comprising:
   providing a database comprising unique display position settings corresponding to each user of a plurality of user identities;
   recognizing a user identity of a user of an electronic device by gesture recognition of a gesture performed by the user;
   retrieving, from the database, a display position setting corresponding to the recognized user identity; and
   automatically adjusting a viewing position of a display of the electronic device, including an orientation of the display, based on the retrieved display position setting from the database, wherein adjusting the viewing position of the display includes adjusting the orientation of the display by rotating the display in a clockwise or counter clockwise direction along a plane, wherein the plane is planar to the display.

8. The method of claim 7, wherein automatically adjusting the viewing position of the display comprises adjusting a height of the display, a viewing angle of the display, or a combination thereof.

9. The method of claim 8, wherein adjusting the viewing angle of the display comprises:
   adjusting a horizontal viewing angle of the display, adjusting a vertical viewing angle of the display, or a combination thereof.

10. The method of claim 7, wherein recognizing the user identity of the user of the electronic device comprises:
   extracting gesture information for the gesture performed by the user from input image data coming from an image capturing device; and performing the gesture recognition by comparing the extracted gesture information is compared with gesture information stored in the database to visually recognize the user identity, wherein the database comprises gesture information of each user of the plurality of user identities.

11. The method of claim 7, wherein the viewing position of the display is automatically adjusted based on the retrieved display position via a supporting platform connected to the electronic device.

12. A non-transitory machine-readable storage medium comprising instructions executable by a processor of an electronic device to:
   receive input data from an input capturing device;
   extract speech information from the input data;
   identify a user identity of a user of the electronic device by comparing the extracted speech information with speech information stored in a database;
   retrieve a unique display position setting corresponding to the identified user identity from the database; and
   instruct to adjust a viewing position of a display of the electronic device, including an orientation of the display, based on the retrieved display position setting, wherein adjusting the viewing position of the display includes adjusting the orientation of the display by rotating the display in a clockwise or counter clockwise direction along a plane, wherein the plane is planar to the display.

13. The non-transitory machine-readable storage medium of claim 12, wherein the instructions are executable by the processor to adjust a height of the display, a viewing angle of the display, or a combination thereof.

14. The non-transitory machine-readable storage medium of claim 13, wherein the instructions are executable by the processor to:
   adjust a horizontal viewing angle of the display, adjust a vertical viewing angle of the display, or a combination thereof.

15. The non-transitory machine-readable storage medium of claim 12, further comprising instructions that are executable by the processor to:
   provide the database, wherein the display position setting and the speech information related to the user identity associated with the display position setting are stored in the database.

* * * * *